United States Patent
Koo

(10) Patent No.: US 8,659,588 B2
(45) Date of Patent: Feb. 25, 2014

(54) DISPLAY SUBSTRATE AND DISPLAY APPARATUS HAVING THE SAME

(75) Inventor: Bon-Yong Koo, Asan-si (KR)

(73) Assignee: Samsung Display Co., Ltd. (KR)

( * ) Notice: Subject to any disclaimer, the term of this patent is extended or adjusted under 35 U.S.C. 154(b) by 253 days.

(21) Appl. No.: 13/111,065

(22) Filed: May 19, 2011

(65) Prior Publication Data

US 2012/0032937 A1    Feb. 9, 2012

(30) Foreign Application Priority Data

Aug. 9, 2010  (KR) .......................... 10-2010-0076287

(51) Int. Cl.
*G06F 3/038*    (2013.01)

(52) U.S. Cl.
USPC .................. 345/211; 345/48; 345/55; 345/84; 345/173; 345/204; 345/212; 345/213; 345/214; 377/78; 377/96; 377/68; 327/291; 327/292; 327/293; 327/294; 327/295; 327/296; 327/297; 327/298; 327/299

(58) Field of Classification Search
USPC ............... 345/48, 55, 84, 173, 204, 211–214; 377/78, 79, 68; 327/291–299
See application file for complete search history.

(56) References Cited

U.S. PATENT DOCUMENTS

| | | | |
|---|---|---|---|
| 2003/0001800 A1* | 1/2003 | Nakajima et al. | 345/55 |
| 2003/0174118 A1* | 9/2003 | Sato et al. | 345/100 |
| 2005/0057477 A1* | 3/2005 | Yun et al. | 345/93 |
| 2008/0001904 A1* | 1/2008 | Kim et al. | 345/100 |
| 2010/0259529 A1* | 10/2010 | Nishi et al. | 345/212 |
| 2011/0096258 A1* | 4/2011 | Shim et al. | 349/39 |
| 2012/0229712 A1* | 9/2012 | Yoshida et al. | 348/792 |

* cited by examiner

*Primary Examiner* — Joseph Haley
*Assistant Examiner* — Linh N Hoffner
(74) *Attorney, Agent, or Firm* — Cantor Colburn LLP

(57) ABSTRACT

A display substrate includes a base substrate including a display area and a peripheral area, a pixel disposed on the display area, wherein the pixel includes; a pixel transistor connected to a gate line and a data line which cross each other, and a pixel electrode connected to the pixel transistor and the pixel electrode, and a gate driving circuit disposed on the peripheral area, wherein the gate driving circuit outputs a gate signal to the gate line and comprises a plurality of stages, an n-th stage of the gate driving circuit including a plurality of circuit transistors and a boosting capacitor including a first capacitor and a second capacitor, the plurality of circuit transistors and the first capacitor being disposed on a first area and the second capacitor being disposed on a second area of the peripheral area positioned between the first area and the display area.

15 Claims, 10 Drawing Sheets

DISPLAY SUBSTRATE AND DISPLAY APPARATUS HAVING THE SAME

This application claims priority to Korean Patent Application No. 2010-76287, filed on Aug. 9, 2010, and all the benefits accruing therefrom under 35 U.S.C. §119, the content of which in its entirety is herein incorporated by reference.

BACKGROUND OF THE INVENTION

1. Field of the Invention

Exemplary embodiments of the present invention relate to a display substrate and a display apparatus having the display substrate. More particularly, exemplary embodiments of the present invention relate to a display substrate capable of enhancing reliability thereof and a display apparatus having the display substrate.

2. Description of the Related Art

In a liquid crystal display ("LCD") apparatus, which typically displays an image using birefringence of a liquid crystal material, various efforts for improving performances thereof and for reducing manufacturing costs thereof have been developed, so that the LCD apparatus has been widely used in comparison with other types of display apparatus. One of the efforts for reducing manufacturing costs of an LCD is an amorphous silicon gate ("ASG") technology in which a gate driving circuit is directly integrated on a glass substrate when a thin-film transistor ("TFT") is formed on the glass substrate.

When the ASG technology is employed with a small-sized LCD panel, manufacturing costs thereof may be decreased. However, when the ASG technology is employed to a large-sized LCD panel, a size of the gate driving circuit formed on the glass substrate may be increased. When a formation size of the gate driving circuit is increased, a size of a glass substrate used to manufacture the large-sized LCD panel may also be increased. Thus, manufacturing costs of the LCD panel may be increased. However, when a width of the gate driving circuit is increased when the size of the glass substrate is fixed, the number of manufacturable LCD panels, e.g., the number of LCD panels of sufficient quantity for sale to consumers, is decreased, so that manufacturing costs of the LCD panel may be increased.

Moreover, when the LCD panel having a uniform display size in a state where the size of the glass substrate is fixed is designed to have a maximum manufacturable number, an area between an edge portion and a display area of the glass substrate, that is, a size of a peripheral area is set to have a uniform size. When the size of the peripheral area is limited, when a formation size (or a formation width) of the gate driving circuit is increased, an outermost contact portion within the gate driving circuit may be corroded and defects such as an edge stain may be generated due to an insufficient hardening of a sealant around the display.

BRIEF SUMMARY OF THE INVENTION

Exemplary embodiments of the present invention provide a display substrate capable of decreasing a formation size of a gate driving circuit integrated on a glass substrate.

Exemplary embodiments of the present invention also provide a display apparatus having the above-mentioned display substrate.

According to one aspect of the present invention, a display substrate includes; a base substrate, a pixel and a gate driving circuit. The base substrate includes a display area and a peripheral area which surrounds the display area. The pixel is disposed on the display area to include a pixel transistor connected to a gate line and a data line that cross each other and a pixel electrode connected to the pixel transistor and the pixel electrode. The gate driving circuit is disposed on a portion of the peripheral area adjacent to a first terminal of the gate line to output a gate signal to the gate line. The gate driving circuit includes a plurality of stages. An n-th stage (wherein 'n' is a natural number) includes a plurality of circuit transistors and a boosting capacitor including a first capacitor and a second capacitor. The circuit transistors and the first capacitor are disposed on a first area of the peripheral area, and the second capacitor is disposed on a second area of the peripheral area positioned between the first area and the display area.

According to another aspect of the present invention, a display apparatus includes a display panel and a gate driving circuit. The display panel includes a display area on which a plurality of gate lines, a plurality of data lines, and a plurality of pixels displaying an image are disposed and a peripheral area surrounding the display area. The gate driving circuit is disposed on a portion of the peripheral area adjacent to first terminals of the gate lines. The gate driving circuit includes a plurality of stages which output gate signals to the gate lines. An n-th stage of the gate driving circuit includes a plurality of circuit transistors and a boosting capacitor including a first capacitor and a second capacitor. The circuit transistors and the first capacitor are disposed on a first area of the peripheral area, and the second capacitor is disposed on a second area of the peripheral area positioned between the first area and the display area.

According to some exemplary embodiments of the present invention, a formation area of the gate driving circuit is decreased and the gate driving circuit is moved (or shifted) toward a display area by as much as the decreased area, so that it prevents a corrosion of the outermost contact portion and defects such as an edge stain generated due to a non-hardening of a sealant.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Figure 1:
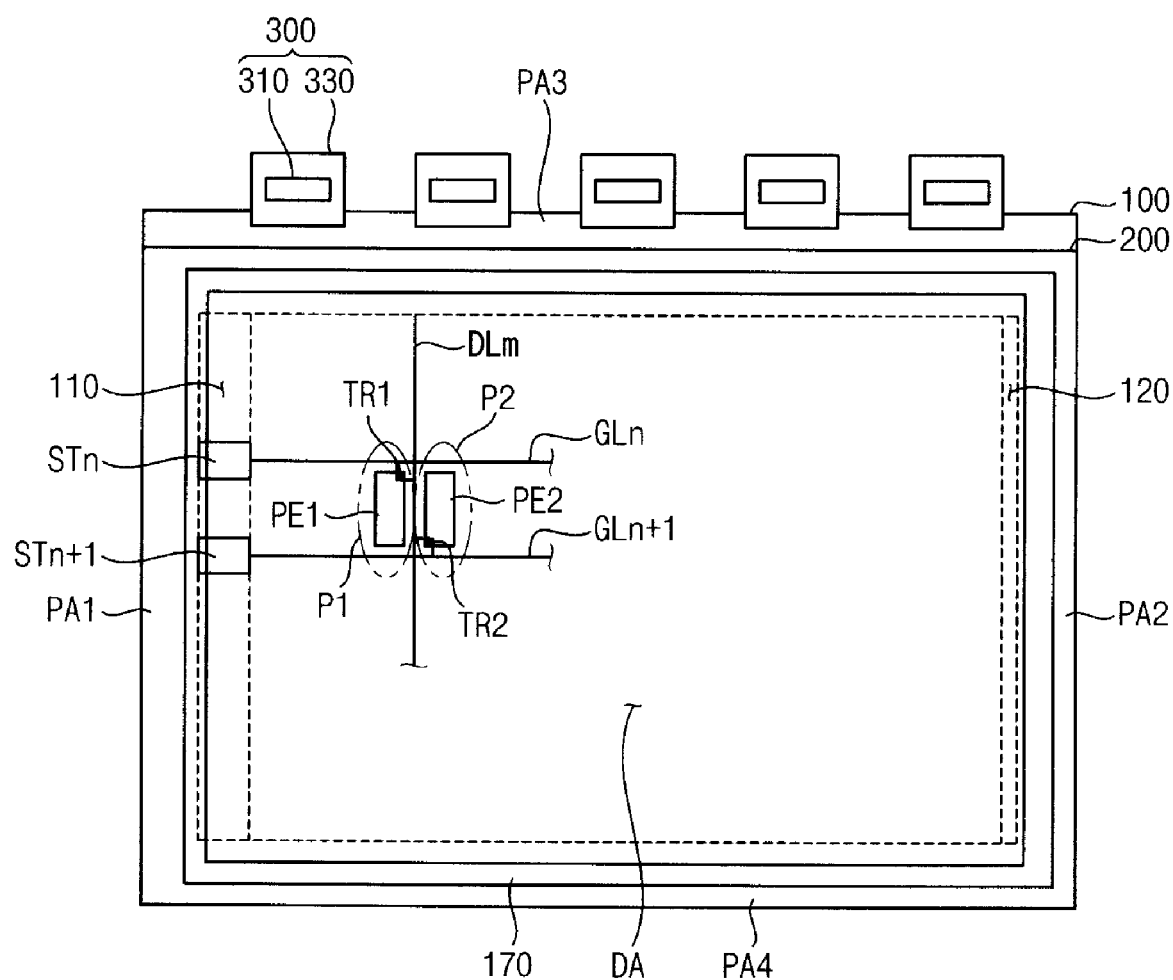
FIG. 1 is a top plan view illustrating an exemplary embodiment of a display apparatus according to the present invention.
Figure 1:
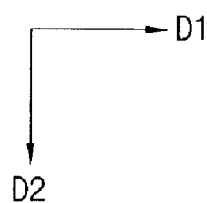

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element's as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

FIG. 1 is a top plan view illustrating an exemplary embodiment of a display apparatus according to the present invention.

Referring to FIG. 1, the exemplary embodiment of a display apparatus includes a display substrate 100, an opposite substrate 200 and a data driving part 300.

The display substrate 100 includes a display area DA, a first peripheral area PA1, a second peripheral area PA2, a third peripheral area PA3 and a fourth peripheral area PA4. In one exemplary embodiment, the first to fourth peripheral areas PA1, PA2, PA3 and PA4 may surround the display area DA.

A plurality of gate lines GLn and GLn+1 which extend substantially in parallel along a first direction D1, a plurality of data lines DLm which extend substantially in parallel along a second direction D2 which crosses the first direction D1, and a plurality of pixels P1 and P2 are formed on the display area DA. The pixels P1 and P2 may be configured into a plurality of pixel rows and a plurality of pixel columns. Each of the pixels P1 and P2 includes a pixel transistor and a pixel electrode connected to the pixel transistor. In the present exemplary embodiment, 'n' and 'm' are natural numbers.

For example, in one exemplary embodiment a first pixel P1 included in the pixel row includes a first pixel transistor TR1 connected to an n-th gate line GLn and an m-th data line DLm and a first pixel electrode PE1 electrically connected to the first pixel transistor TR1. A second pixel P2 adjacent to the first pixel P1 along the first direction D1 includes a second pixel transistor TR2 connected to an (n+1)-th gate line GLn+1 and the m-th data line DLm and a second pixel electrode PE2 electrically connected to the second pixel transistor TR2. That is, the first and second pixels P1 and P2 adjacent to one another in the pixel row may be driven by two gate lines GLn and GLn+1 and one data line DLm. Thus, a pixel structure described above may be beneficial in that it is capable of decreasing the number of data driving chips used to display an image.

The first peripheral area PA1 is adjacent to first terminals of the gate lines GLn and GLn+1. A gate driving circuit 110 generating gate signals which will be applied to the gate lines GLn and GLn+1 is formed on the first peripheral area PA1. In the present exemplary embodiment, the gate driving circuit 110 may be a shift register in which a plurality of stages are connected to each other one after another. Each of the stages includes a plurality of circuit transistors formed by a process substantially identical to a forming process of the pixel transistor. In one exemplary embodiment, the circuit transistors of the stages are formed in a same process as a process for forming the pixel transistors. For example, an n-th stage STn of the gate driving circuit 110 generates an n-th gate signal Gn to provide to the n-th gate line GLn, and an (n+1)-th stage STn+1 generates an (n+1)-th gate signal Gn+1 to provide to the (n+1)-th gate line GLn+1.

According to the present exemplary embodiment, an area on which the gate driving circuit 110 is formed is decreased by a predetermined width along the first direction D1 and then the gate driving circuit 110 is moved (or shifted) toward the display area DA by a predetermined width, so that reliability of the display apparatus may be enhanced. Specifically, by moving the gate driving circuit 110 further towards the display area, a leakage of a sealant surrounding the display may be reduced or effectively prevented as described in more detail below. A process for manufacturing the gate driving circuit 110 will be explained in detail with reference to the following drawings.

The second peripheral area PA2 is adjacent to second terminals of the gate lines GLn and GLn+1. A gate discharging part 120 which discharges a voltage applied to the gate lines GLn and GLn+1 into a low voltage is formed on the second peripheral area PA2. The gate discharging part 120 includes a plurality of circuit transistors. In one exemplary embodiment, the plurality of circuit transistors of the gate discharging part 120 may be formed by a process substantially identical to a process of forming the pixel transistor.

The third peripheral area PA3 is adjacent to first terminals of the data lines DLm. A data driving part 300 which generates a data signal provided to the data lines DLm is disposed on the third peripheral area PA3.

The fourth peripheral area PA4 is adjacent to a second terminal of the data lines DLm.

A sealant 170 is disposed at the first, second, third and fourth peripheral areas PA1, PA2, PA3 and PA4.

The opposite substrate 200 faces the display substrate 100. The opposite substrate 200 is coupled with the display substrate 100 through the sealant 170 to seal a liquid crystal layer (not shown) therebetween.

The data driving part 300 is disposed at the third peripheral area PA3. The data driving part 300 includes a data driving chip 310 generating the data signal and a flexible printed circuit board 330 on which the data driving chip 310 is mounted. In one exemplary embodiment, the data driving chip 310 may be directly mounted on the third peripheral area PA3 in a chip on glass ("COG") manner, although the invention is not limited thereto.

Figure 2A:
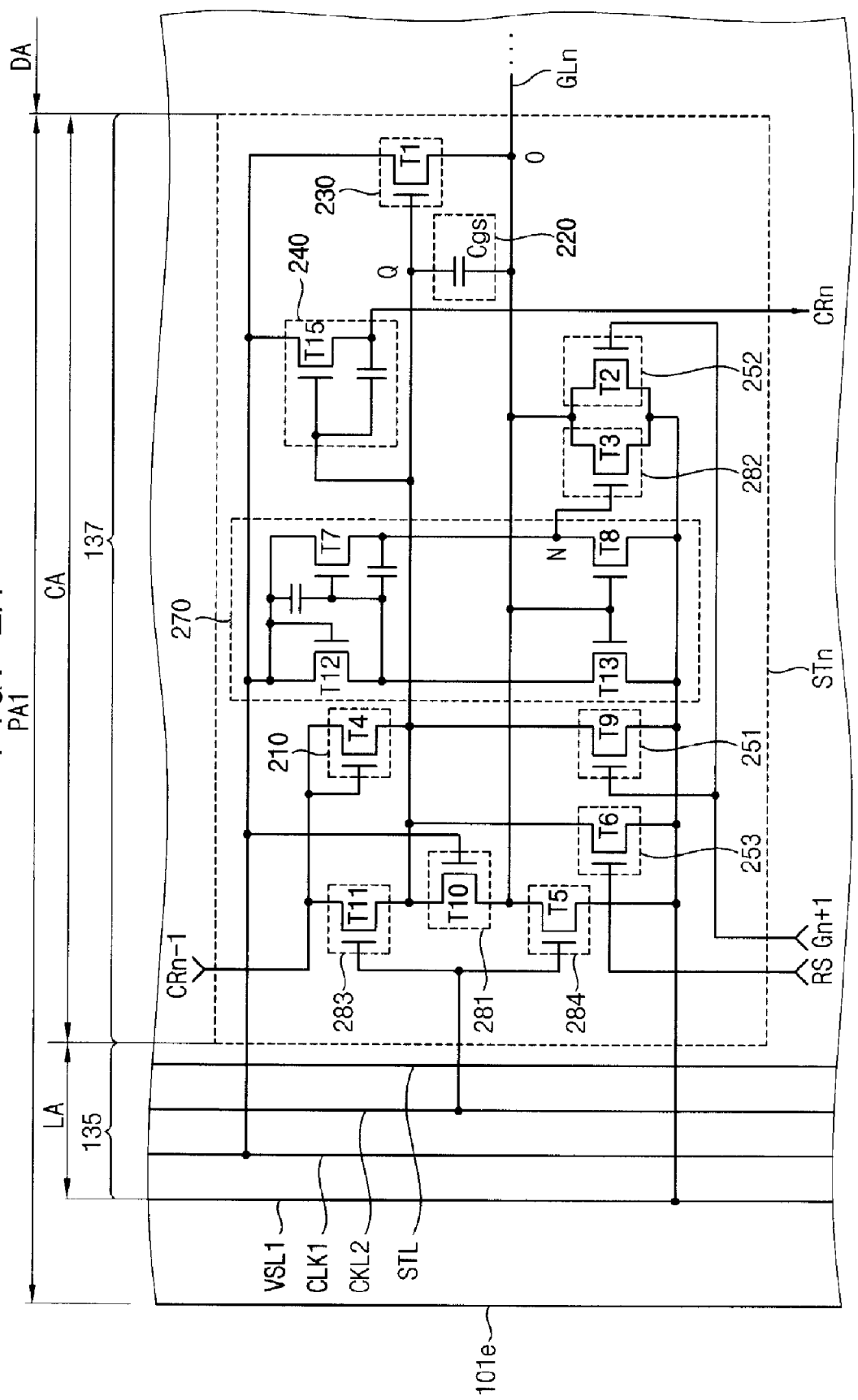
FIGS. 2A and 2B are equivalent circuit diagrams of an exemplary embodiment of a display substrate of FIG. 1.
Figure 2B:
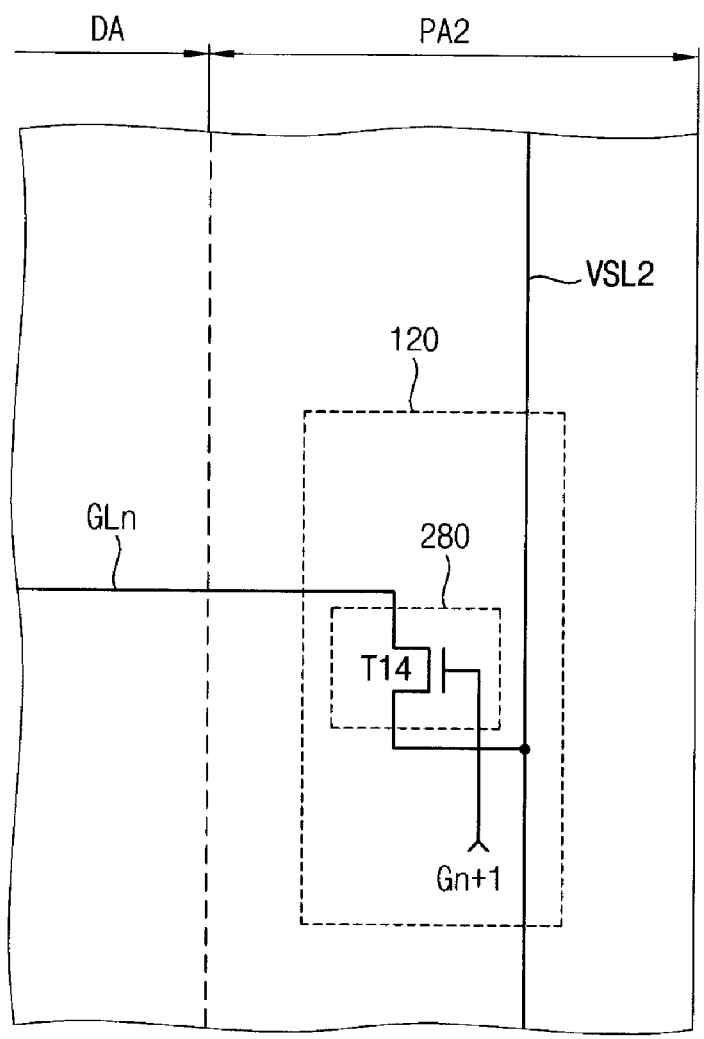

FIGS. 2A and 2B are equivalent circuit diagrams of an exemplary embodiment of a display substrate of FIG. 1.

Referring to FIGS. 1 and 2A, the gate driving circuit 110 is formed at a first peripheral area PA1 of the display substrate 100.

The gate driving circuit 110 includes a line part 135 and a circuit part 137.

The line part 135 includes a first voltage line VSL1, a first clock line CKL1, a second clock line CKL2 and a vertical start line STL delivering a plurality of driving signals to the circuit part 137. Moreover, exemplary embodiments include configurations wherein the line part 135 may further include a third clock line and a fourth clock line. The first voltage line VSL1 delivers a low voltage, the first clock line CKL1 delivers a second clock signal CK2, and the vertical start line STL delivers a vertical start signal STV.

The circuit part 137 may include a plurality of stages. An n-th stage STn includes a plurality of circuit transistors (hereinafter, referred to as a 'transistor'). For example, in the present exemplary embodiment the n-th stage STn includes a buffer part 210, a charging part 220, a pull-up part 230, a carry part 240, a first discharging part 251, a second discharging part 252, a third discharging part 253, a switching part 270, a first maintaining part 281, a second maintaining part 282, a third maintaining part 283 and a fourth maintaining part 284.

The buffer part 210 may include a fourth transistor T4. The fourth transistor T4 includes a control electrode, an input electrode and an output electrode. The control and input electrodes of the fourth transistor T4 are configured to receive an (n−1)-th carry signal CRn−1 from a previous stage of the plurality of stages, that is, an (n−1)-th stage, and the output electrode of the fourth transistor T4 is connected to a Q node 'Q'. The buffer part 210 charges a high voltage VDD of the (n−1)-th carry signal CRn−1 into the charging part 220 connected to the Q node 'Q' in response to a high voltage of the (n−1)-th carry signal CRn−1.

In one exemplary embodiment, the charging part 220 may include a boosting capacitor Cgs. The boosting capacitor Cgs includes a first terminal connected to the Q node 'Q' and a second terminal connected to an output node 'O' of the n-th stage STn.

In one exemplary embodiment, the pull-up part 230 may include a first transistor T1. A control electrode of the first transistor T1 is connected to the first terminal of the charging part 220 connected to the Q node 'Q', an input electrode of the first transistor T1 is configured to receive a first clock signal CK1, and an output electrode of the first transistor T1 is connected to the output node 'O' of the n-th stage STn. When a high voltage charged in the boosting capacitor Cgs is applied to the control electrode of the pull-up part 230, the pull-up part 230 is bootstrapped when the first clock signal CK1 is received. In such a configuration, the boosting capacitor Cgs may boost a voltage charged therein. The pull-up part 230 outputs a high voltage of the first clock signal CK1 as an n-th gate signal through the output node 'O' in response to the boosted voltage.

In one exemplary embodiment, the carry part 240 may include a fifteenth transistor T15. The fifteenth transistor T15 includes a control electrode connected to the Q node 'Q', an input electrode configured to receive the first clock signal CK1 and an output electrode connected to a subsequent stage of the plurality of stages, that is, an (n+1)-th stage STn+1. When a high voltage is applied to the Q node 'Q', the carry part 240 outputs a high voltage of the first clock signal CK1 as an n-th carry signal CRn to the (n+1)-th stage STn+1.

In one exemplary embodiment, the first discharging part 251 may include a ninth transistor T9. The ninth transistor T9 includes a control electrode connected to one of the subsequent stages, that is, an (n+1)-th stage STn+1, an input electrode connected to the Q node 'Q', and an output electrode connected to the first voltage line VSL1. The first discharging part 251 discharges a voltage applied to the Q node 'Q' as the low voltage VSS in response to a high voltage of the (n+1)-th gate signal Gn+1 output from the (n+1)-th stage.

In one exemplary embodiment, the second discharging part 252 may include a second transistor T2. The second transistor T2 includes a control electrode connected to the (n+1)-th stage STn+1, an input electrode connected to the output node 'O', and an output electrode connected to the first voltage line VSL1. The second discharging part 252 discharges a voltage applied to the output node 'O' as the low voltage VSS in response to a high voltage of the (n+1)-th gate signal Gn+1.

In one exemplary embodiment, the third discharging part 253 may include a sixth transistor T6. The sixth transistor T6 includes a control electrode configured to receive a reset signal RS, an input electrode connected to the Q node 'Q', and an output electrode connected to the first voltage line VSL1. The third discharging part 253 discharges a voltage applied to the Q node 'Q' as the low voltage in response to a high voltage of the reset signal RS outputted from the last stage of the gate driving circuit 110.

In one exemplary embodiment, the switching part 270 may include a twelfth transistor T12, a seventh transistor T7, a thirteenth transistor T13 and an eighth transistor T8. When a high voltage is applied to the output node 'O', the eighth and thirteenth transistors T8 and T13 are turned off to discharge a voltage applied to the N node 'N' as the low voltage VSS. When a low voltage is applied to the output node 'O', the eighth and thirteenth transistors T8 and T13 are turned off so that a signal synchronized with the first clock signal CK1 is applied to the N node 'N'.

In one exemplary embodiment, the first maintaining part 281 may include a tenth transistor T10. The tenth transistor T10 includes a control electrode configured to receive the first clock signal CK1, an input electrode connected to the Q node 'Q', and an output electrode connected to the output node 'O'. The first maintaining part 281 maintains a voltage of the Q node 'Q' into a voltage of the output node 'O' in response to a high voltage of the first clock signal CK1.

In one exemplary embodiment, the second maintaining part 282 may include a third transistor T3. The third transistor T3 includes a control electrode connected to the N node 'N', an input electrode connected to the output node 'O', and an output electrode connected to the first voltage line VSL1. The second maintaining part 282 maintains a voltage of the output node 'O' at a voltage level of a low voltage VSS in response to a high voltage applied to the N node 'N'.

In one exemplary embodiment, the third maintaining part 283 may include an eleventh transistor T11. The eleventh transistor T11 includes a control electrode connected to a second clock line CKL2 to receive a second clock signal CK2, and input electrode configured to receive the (n−1)-th carry signal CRn−1 of an (n−1)-th stage of the previous stages, and an output electrode connected to the Q node 'Q'. The third maintaining part 283 maintains a voltage of the Q node 'Q' as a voltage level of the (n−1)-th carry signal CRn−1 in response to a high voltage of the second clock signal CK2.

In one exemplary embodiment, the fourth maintaining part 284 may include a fifth transistor T5. The fifth transistor T5 includes a control electrode configured to receive the second clock signal CK2, an input electrode connected to the output node 'O', and an output electrode connected to the first voltage line VSL1. The fourth maintaining part 284 maintains a voltage of the output node 'O' at the low voltage VSS in response to a high voltage of the second clock signal CK2.

Referring to FIGS. 1 and 2B, a gate discharging part 120 is formed at the second peripheral area PA2 of the display substrate 100.

The gate discharging part 120 includes a gate discharging switch 280. The gate discharging switch 280 may include a fourteenth transistor T14. The fourteenth transistor T14 includes a control electrode connected to an (n+1)-th gate line GLn+1, an input electrode connected to an n-th gate line GLn, and an output electrode connected to a second voltage line VSL2. The gate discharging switch 280 discharges a voltage applied to the n-th gate line GLn into a low voltage VSS when a high voltage is applied to the (n+1)-th gate line GLn+1.

Figure 3:
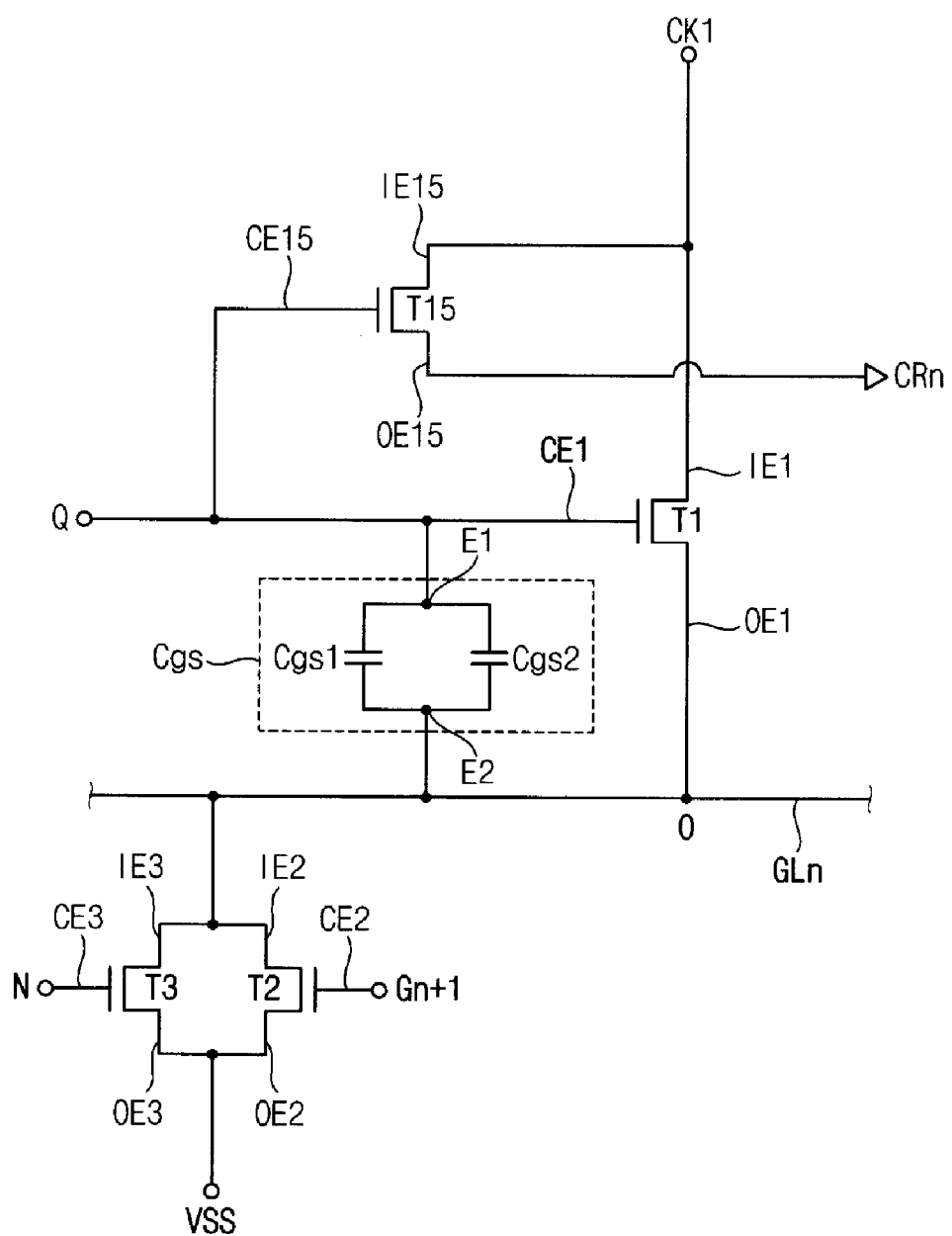
FIG. 3 is a partial circuit diagram of a gate driving circuit of FIG. 2A.
Figure 4:
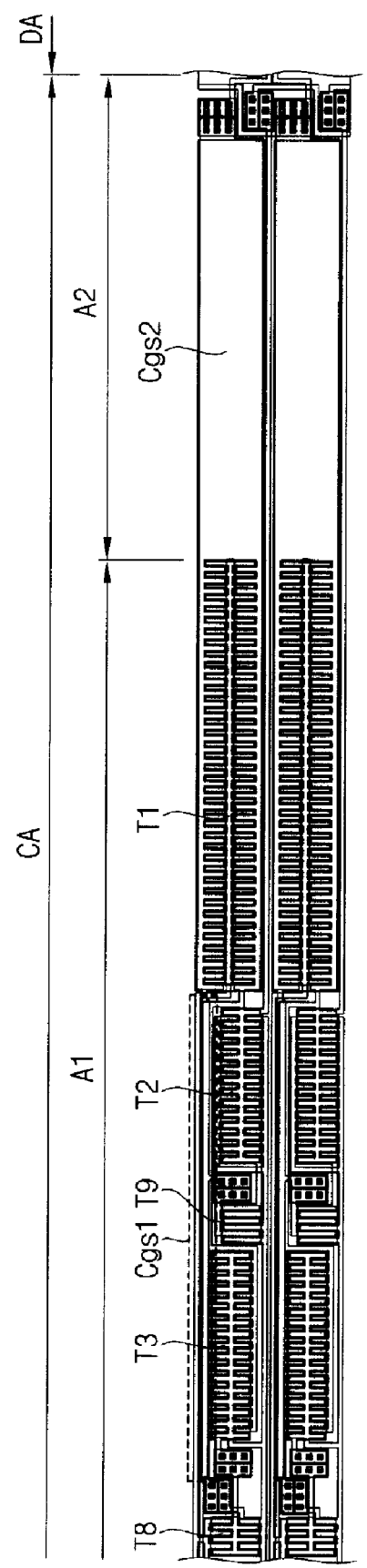
FIG. 4 is a layout diagram illustrating a circuit of FIG. 3.

FIG. 3 is a partial circuit diagram of an exemplary embodiment of a gate driving circuit of FIG. 2A. FIG. 4 is a layout diagram illustrating an exemplary embodiment of a circuit diagram of FIG. 3.

Referring to FIGS. 2, 3 and 4, the gate driving circuit 110 includes a plurality of transistors T1, T2, T3, ..., T13 and T15 and a boosting capacitor Cgs including a first capacitor Cgs1 and a second capacitor Cgs2 that are connected in parallel.

The transistors T1, T2, T3, ..., T13 and T15 and the first capacitor Cgs1 are formed on a first area A1 of the circuit area CA, and the second capacitor Cgs2 is formed on a second area A2 positioned between the first area A1 and the display area DA.

The first capacitor Cgs1 is formed on an area where a first metal connection line (hereinafter, referred to as a gate connection line) connected to a control electrode CE1 of the first transistor T1 and a second metal connection line (hereinafter, referred to as a source connection line) connected to an output electrode OE1 of the first transistor T1 overlap one another.

The second capacitor Cgs2 is formed on a second area between the first transistor T1 and the display area DA. The second capacitor Cgs2 includes a first metal electrode pattern (hereinafter, referred to as a gate electrode pattern) which extends from a control electrode CE1 of the first transistor T1, and a second metal electrode pattern (hereinafter, referred to as a source electrode pattern) which extends from an output electrode OE1 of the first transistor T1.

For example, the fifteenth transistor T5 includes a control electrode CE15 connected to a control electrode CE1 of the first transistor T1 through the Q node 'Q', and an input electrode IE15 configured to receive a first clock signal CK1, and an output electrode OE15 configured to output an n-th carry signal CRn. The third transistor T3 includes a control electrode connected to the N node 'N', an output electrode connected to an output electrode OE1 of the first transistor CE3, and an output electrode OE3 configured to receive a low voltage VSS. The second transistor T2 includes a control electrode CE2 configured to receive an (n+1)-th gate signal Gn+1, an input electrode IE2 connected to an output electrode OE1 of the first transistor T1, and an output electrode configured to receive the low voltage VSS. The first transistor T1 includes a control electrode CE1 connected to the Q node 'Q', an input electrode IE1 configured to receive the first clock signal CK1, and an output electrode OE1 connected to an n-th gate line GLn.

Accordingly, the first capacitor Cgs1 is formed on an area where the gate connection line, which connects the control electrode CE1 of the first transistor T1 and the control electrode CE15 of the fifteenth transistor T15, overlaps the source connection line which connects the output electrode OE1 of the first transistor T1 and the input electrode IE3 of the third transistor T3.

Figure 5A:
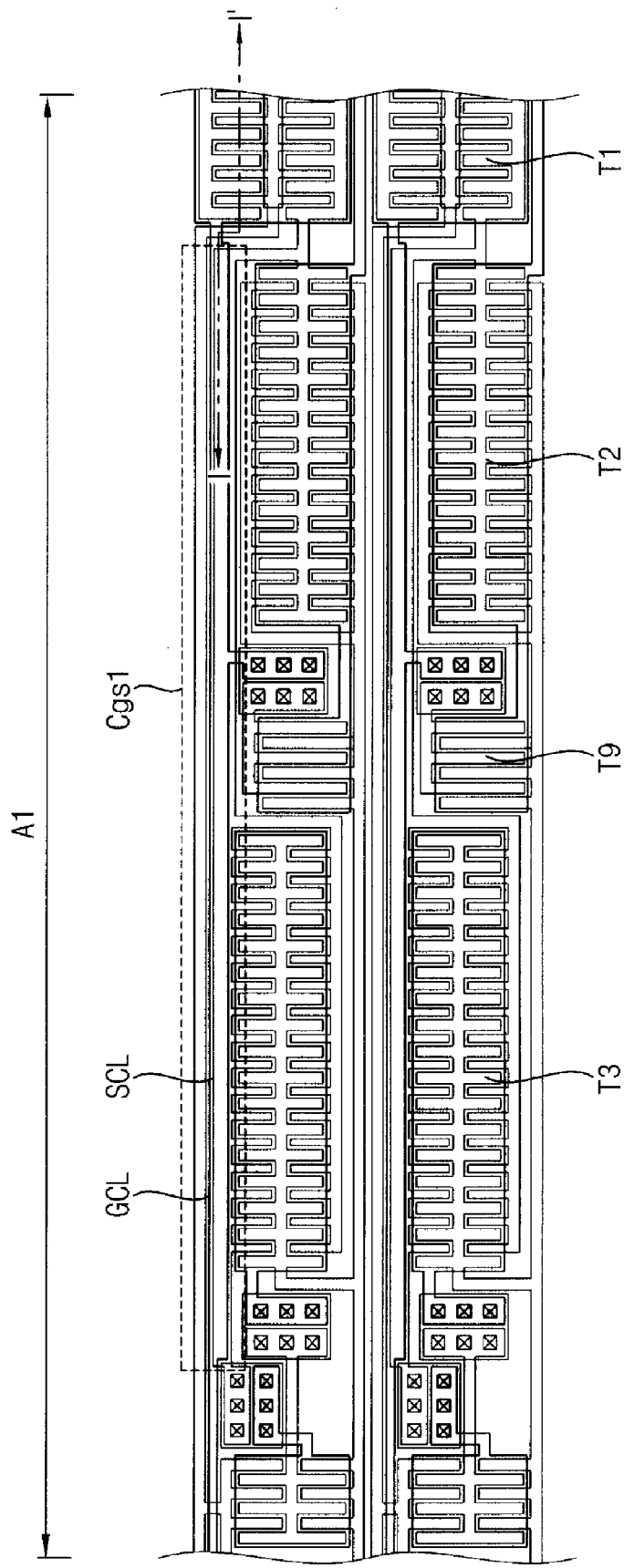
FIG. 5A is an enlarged layout diagram of a first capacitor of FIG. 4.
Figure 5B:
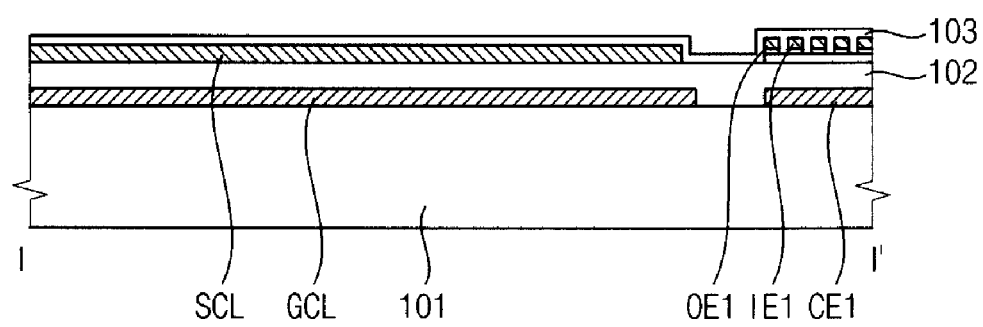
FIG. 5B is a cross-sectional view taken along line I-I' of FIG. 5A.

FIG. 5A is an enlarged layout diagram of the exemplary embodiment of a first capacitor of FIG. 4. FIG. 5B is a cross-sectional view taken along line I-I' of FIG. 5A.

Referring to FIGS. 5A and 5B, the first capacitor Cgs1 includes a gate connection line GCL and a source electrode line SCL. The gate connection line GCL connects a control electrode CE1 of the first transistor T1 and a control electrode CE15 of the fifteenth transistor T15. The source connection line SCL partially overlaps the gate connection line GCL to connect an output electrode OE3 of the first transistor T1 and an input electrode IE3 of the third transistor T3.

In one exemplary embodiment, the gate connection line GCL is patterned from a metal layer substantially identical to a control electrode CE1 of the first transistor T1. The gate insulation layer 102 is formed on a base substrate 101 on which the gate connection line GCL is formed. The source connection line SCL is disposed on the gate insulation layer 102, which is partially overlapped by the gate connection line GCL. In one exemplary embodiment, the source connection line SCL is patterned from a metal layer substantially identical to the input electrode IE1 and the output electrode OE1 of the first transistor T1.

A protection insulation layer 103 is formed on the base substrate 101 on which the source connection line SCL is formed. A transparent organic insulation layer or a non-transparent organic insulation may be formed on the protection insulation layer 103.

The first capacitor Cgs1 may be formed by the gate connection line GCL, the portion of the source connection line SCL which is partially overlapped by the gate connection line GCL, and the gate insulation layer 102 disposed between the gate connection line GCL and the source connection line SCL.

Figure 6A:
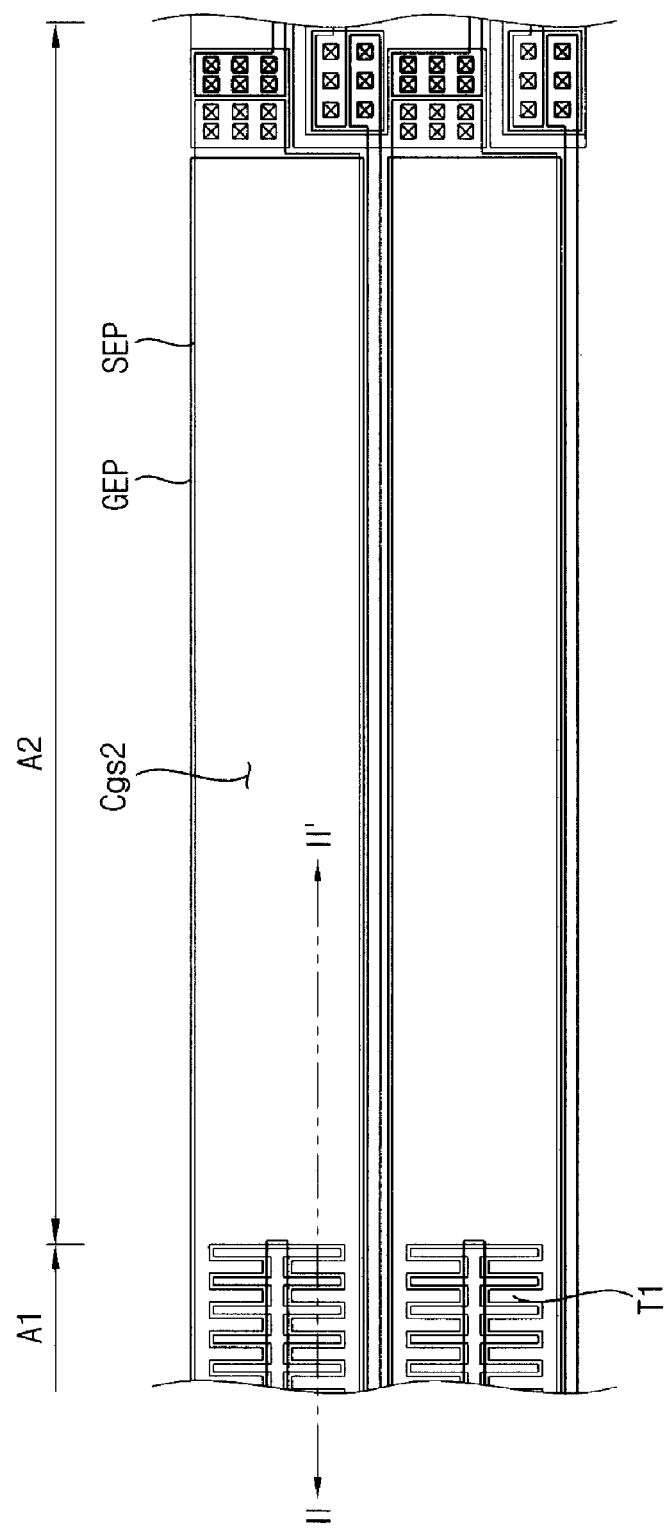
FIG. 6A is an enlarged layout diagram of a second capacitor of FIG. 4.
Figure 6B:
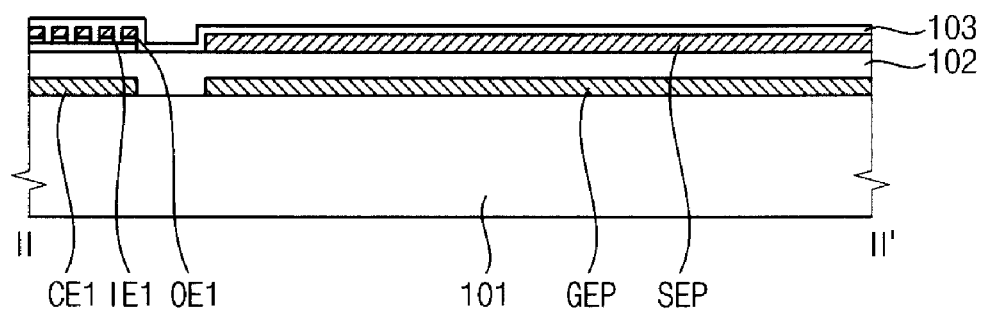
FIG. 6B is a cross-sectional view taken along line II-II' of FIG. 6A.

FIG. 6A is an enlarged layout diagram of a second capacitor of FIG. 4. FIG. 6B is a cross-sectional view taken along line II-II' of FIG. 6A.

Referring to FIGS. 6A and 6B, the second capacitor Cgs2 includes a gate electrode pattern GEP which extends from a control electrode CE1 of the first transistor T1 and a source electrode pattern SEP which extends from an output electrode OE1 of the first transistor T1.

In one exemplary embodiment, the gate electrode pattern GEP is patterned from a metal layer substantially identical to a control electrode CE1 of the first transistor T1. A gate insulation layer 102 is formed on a base substrate 101 on which the gate electrode pattern GEP is formed. The source electrode pattern SEP which overlaps the gate electrode pattern GEP is disposed on the gate insulation layer 102. In one exemplary embodiment, the source electrode pattern SEP is patterned from a metal layer substantially identical to an input electrode IE1 and an output electrode OE1 of the first transistor T1.

In one exemplary embodiment, a protection insulation layer 103 is formed on the base substrate 101 on which the source electrode pattern SEP is already formed. A transparent organic insulation layer or a non-transparent organic insulation may be formed on the protection insulation layer 103.

The second capacitor Cgs2 may be formed by the gate electrode pattern GEP, the portion of the source electrode pattern SEP which partially overlaps the gate electrode pattern GEP, and the gate insulation layer 102 disposed between the gate electrode pattern GEP and the source electrode pattern SEP.

As described above, the first metal connection line and the second metal connection line which connect the plurality of transistors to each other are overlapped with each other to form the first capacitor Cgs1 of the boosting capacitor Cgs, so that an area used for forming the second capacitor Cgs2 may be decreased. As a result, an area where the gate driving circuit 110 is formed may be decreased.

Figure 7:
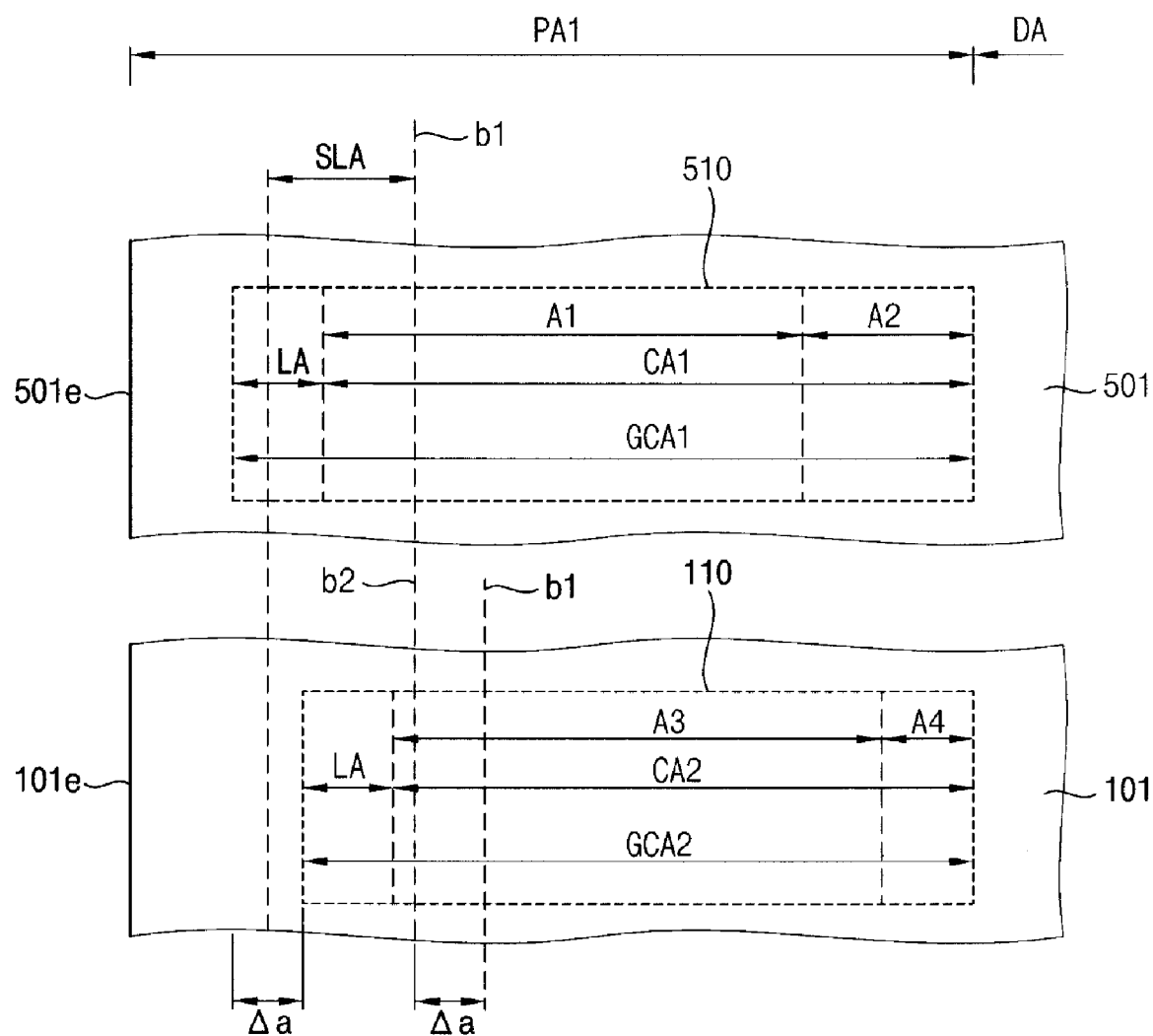
FIG. 7 is a schematic diagram showing an effect in accordance with the exemplary embodiment of a display substrate of FIG. 4.

FIG. 7 is a schematic diagram showing an exemplary embodiment of the display substrate of FIG. 4.

Referring to FIGS. 4 and 7, a gate circuit area GCA1 on which a gate driving circuit 510 is formed is formed at a first peripheral area PA1 of a first display substrate 501 according to a comparative embodiment. A line area LA and a circuit area CA1 are formed at the gate circuit area GCA1, which is adjacent to a boundary 501e of a base substrate 501.

A plurality of transistors T1, T2, T3, ..., T13 and T15 and a boosting capacitor Cgs are formed on the circuit area CA1 according to the comparative embodiment. The transistors T1, T2, T3, ..., T13 and T15 are formed on a first area A1 of the circuit area CA1, and the boosting capacitor Cgs is formed on a second area A2 of the circuit area CA1. The boosting capacitor Cgs is formed between the first area A1 and the display area DA as an overlapping area of a gate electrode pattern GEP and a source electrode pattern SEP.

A gate circuit area GCA2 on which the gate driving circuit 110 is formed is formed at a first peripheral area PA1 of a second display substrate 101 according to an exemplary embodiment. A line area LA and a circuit area CA2 are defined at the gate circuit area GCA2, which is adjacent to a boundary 101e of the base substrate 101.

A plurality of transistors T1, T2, T3, ..., T13 and T15 and a boosting capacitor Cgs are formed on the circuit area CA2 according to the present exemplary embodiment. The transistors T1, T2, T3, ..., T13 and T15 are formed on a third area A3 of the circuit area CA2. The boosting capacitor Cgs includes a first capacitor Cgs1 and a second capacitor Cgs2. The first capacitor Cgs1 is formed on a third area A3 on which the plurality of transistors T1, T2, T3, ..., T13 and T15 are formed. For example, the first capacitor Cgs1 is formed by an overlapping area of a gate connection line GCL and a source connection line SCL. The gate connection line GCL connects a control electrode of a fifteenth transistor T15 and a control electrode of a first transistor T1. The source connection line SCL partially overlaps with the gate connection line GCL to connect an output electrode OE3 of the first transistor T1 and an input electrode IE3 of the third transistor T3.

The second capacitor Cgs2 is formed on a fourth area A4 of the gate circuit area GCA2. The second capacitor Cgs2 may be formed by a gate electrode pattern GEP and a source electrode SEP between the third area A3 and the display area DA.

Thus, the fourth area A4 on which the second capacitor Cgs2 is formed is substantially smaller than the second area A2 of the comparative embodiment. That is, the fourth area A4 has an area corresponding to a remaining capacitance in which a capacitance of the first capacitor Cgs1 is subtracted from a capacitance of a boosting capacitor Cgs of the comparative embodiment.

As a result, the gate circuit area GCA2 according to the present exemplary embodiment is decreased by about a decreased area □a corresponding to a capacitance of the first capacitor Cgs1 rather than by a decreased area □a corresponding to a capacitance of the gate circuit area GCA1 according to the comparative embodiment. Thus, the gate driving circuit 110 according to the present exemplary embodiment may be spaced apart from a boundary 101e of the base substrate 101 by about the decreased amount □a of the present exemplary embodiment rather than by a decreased amount □a of the comparative embodiment, so that the gate driving circuit 110 may be formed closer to the display area DA in order to prevent display defects.

When the gate driving circuit 110 is spaced apart from the boundary 101e, an erosion probability of a contact portion positioned at an outermost portion of the gate driving circuit 110 may be decreased. As the contact portion is formed from a conductive layer which forms a pixel electrode on the display area, an insulation layer is not formed on the contact portion. Thus, the contact portion may be directly deteriorated by pollution particles When the outermost contact portion is close to the boundary 101e of the base substrate 101, a probability of moisture and oxygen infiltrating between a sealant and the base substrate 101 at the outermost contact portion may be increased. Thus, an erosion probability may be increased in the outermost contact portion.

Moreover, in the base substrate 501 according to the comparative embodiment, the seal line area SLA may be formed from a left side of the gate circuit area GCA1 to a first position b1. In contrast, in the presented exemplary embodiment of a base substrate 101 according to the present invention, the seal line area SLA may be formed from a left side of the gate circuit area GCA2 to a second position b2. The second position b2 is moved (or shifted) from the first position b by the decreased amount Δa.

As a result, the sealant may be formed on an area where a forming density of transistors is high on a base substrate 501 according to the comparative embodiment; however, according to the present exemplary embodiment, the sealant may be formed on an area where a forming density of transistors is lower than that of the comparative embodiment on a base substrate 101. Thus, in a sealant hardening process hardening the sealant by irradiating light onto a rear surface of the base substrate, since a light transmittance of the base substrate 101 according to the exemplary embodiment is high, the sealant may be fully hardened. In contrast, since a light transmittance of the base substrate 501 according to the comparative embodiment is low, the sealant may be not hardened. When the sealant is not fully hardened, the sealant is continuously leaked to a liquid crystal layer so that defects such as an edge stain may be generated at a boundary of the display area DA.

Therefore, according to the present exemplary embodiment, a formation area of the gate driving circuit is decreased and the gate driving circuit is moved (or shifted) toward a display area by a decreased area, so that it prevents a corrosion of the outermost contact portion and defects such as an edge stain generated due to a non-hardening of a sealant.

The foregoing is illustrative of the present invention and is not to be construed as limiting thereof. Although a few exemplary embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display substrate comprising:
    a base substrate comprising a display area and a peripheral area which surrounds the display area;
    a pixel disposed on the display area, wherein the pixel comprises:
        a pixel transistor connected to a gate line and a data line which cross each other; and
        a pixel electrode connected to the pixel transistor and the pixel electrode; and
    a gate driving circuit disposed on a portion of the peripheral area which is adjacent to a first terminal of the gate line, wherein
    the gate driving circuit outputs a gate signal to the gate line, and comprises a plurality of stages, and
    an n-th stage, wherein 'n' is a natural number, of the gate driving circuit comprises:
        a plurality of circuit transistors, a first transistor of which outputs a first clock signal as an n-th gate signal, and
        a boosting capacitor comprising a first capacitor and a second capacitor,
    wherein
    the boosting capacitor is connected to a control electrode and an output electrode of the first transistor, and
    the plurality of circuit transistors and the first capacitor are disposed on a first area of the peripheral area, and the second capacitor is disposed on a second area of the peripheral area positioned between the first area and the display area.

2. The display substrate of claim 1, wherein the second capacitor comprises:
    a first metal electrode pattern which extends from the control electrode of the first transistor; and
    a second metal electrode pattern which extends from the output electrode of the first transistor.

3. The display substrate of claim 1, wherein the first capacitor comprises:
    a first metal connection line connected to the control electrode of the first transistor; and
    a second metal connection line which overlaps with the first metal connection line and is connected to the output electrode of the first transistor.

4. The display substrate of claim 3, wherein the n-th stage comprises:
    a second transistor which discharges a voltage of an output node connected to the output electrode of the first transistor to a low voltage; and
    a third transistor which discharges a voltage of the output node to a low voltage in response to a signal synchronized with the first clock signal,
    wherein the second metal connection line of the first capacitor connects the output electrode of the first transistor and an input electrode of the third transistor.

5. The display substrate of claim 3, wherein the n-th stage further comprises a fifteenth transistor which outputs the first clock signal as an n-th carry signal in response to a signal applied to the control electrode of the first transistor, and
    wherein the first metal connection line of the first capacitor connects the control electrode of the first transistor and a control electrode of the fifteenth transistor.

6. The display substrate of claim 3, wherein the n-th stage further comprises:
    a tenth transistor comprising:
        a control electrode which the first clock signal;
        an input electrode connected to the control electrode of the first transistor; and
        an output electrode connected to the output electrode of the first transistor;
    an eleventh transistor which maintains a voltage applied to the control electrode of the first transistor at a low voltage of a carry signal received from at least one of a previous stage of the plurality of stages in response to a second clock signal;
    a fifth transistor which maintains a voltage applied to the output electrode of the first transistor at a low voltage in response to the clock signal;
    a sixth transistor which maintains a voltage applied to the control signal of the first transistor at the low voltage in response to a reset signal; and
    a ninth transistor which discharges a voltage applied to the control electrode of the first transistor to the low voltage in response to a gate signal received from a subsequent stage of the plurality of stages.

7. The display substrate of claim 3, further comprising a gate discharging circuit disposed on a portion of the peripheral area which is adjacent to a second terminal of the gate lines,
wherein the gate discharging circuit further comprises a fourteenth transistor which discharges a voltage applied to an n-th gate line to a low voltage in response to a voltage applied to an (n+1)-th gate line.

8. A display apparatus comprising:
a display panel comprising:
a display area on which a plurality of gate lines, a plurality of data lines, and a plurality of pixels which display an image are formed; and
a peripheral area which surrounds the display area; and
a gate driving circuit disposed on a portion of the peripheral area adjacent to first terminals of the plurality of gate lines, and comprising a plurality of stages which output gate signals to the plurality of gate lines,
wherein an n-th stage, wherein 'n' is a natural number, of the gate driving circuit comprises:
a plurality of circuit transistors, of which a first transistor outputs a first clock signal as an n-th gate signal, and
a boosting capacitor comprising a first capacitor and a second capacitor,
wherein
the boosting capacitor is connected to a control electrode and an output electrode of the first transistor, and
the plurality of circuit transistors and the first capacitor are disposed on a first area of the peripheral area, and the second capacitor is disposed on a second area of the peripheral area positioned between the first area of the peripheral area and the display area.

9. The display apparatus of claim 8, wherein the second capacitor comprises:
a first metal electrode pattern which extends from the control electrode of the first transistor; and
a second metal electrode pattern which extends from the output electrode of the first transistor.

10. The display apparatus of claim 8, wherein the first capacitor comprises:
a first metal connection line connected to the control electrode of the first transistor; and
a second metal connection line which overlaps with the first metal connection line to be connected to the output electrode of the first transistor.

11. The display apparatus of claim 10, wherein the n-th stage comprises:
a second transistor which discharges a voltage of an output node connected to the output electrode of the first transistor to a low voltage; and
a third transistor which discharges a voltage of the output node to a low voltage in response to a signal synchronized with the first clock signal,
wherein the second metal connection line of the first capacitor connects the output electrode of the first transistor and an input electrode of the third transistor.

12. The display apparatus of claim 10, wherein the n-th stage further comprises a fifteenth transistor which outputs the first clock signal as an n-th carry signal in response to a signal applied to the control electrode of the first transistor, and
wherein the first metal connection line of the first capacitor connects the control electrode of the first transistor and a control electrode of the fifteenth transistor.

13. The display apparatus of claim 10, wherein the n-th stage further comprises:
a tenth transistor comprising a control electrode which receives the first clock signal, an input electrode connected to the control electrode of the first transistor, and an output electrode connected to the output electrode of the first transistor;
an eleventh transistor which maintains a voltage applied to the control electrode of the first transistor at a low voltage of a carry signal received from at least one of a previous stage of the plurality of stages in response to a second clock signal;
a fifth transistor which maintains a voltage applied to the output electrode of the first transistor at a low voltage in response to the clock signal;
a sixth transistor which maintains a voltage applied to the control signal of the first transistor at the low voltage in response to a reset signal; and
a ninth transistor which discharges a voltage applied to the control electrode of the first transistor to the low voltage in response to a gate signal received from a subsequent stage of the plurality of stages.

14. The display apparatus of claim 10, further comprising a gate discharging circuit disposed on a portion of the peripheral area adjacent to second terminals of the plurality of gate lines,
wherein the gate discharging circuit further comprises a fourteenth transistor which discharges a voltage applied to an n-th gate line to a low voltage in response to a voltage applied to an (n+1)-th gate line.

15. The display apparatus of claim 8, wherein the display panel comprises:
a first pixel comprising a first pixel transistor and a first pixel electrode, the first transistor being connected to a first gate line and a data line, and the first pixel electrode being connected to the first pixel transistor; and
a second pixel comprising a second pixel transistor and a second pixel electrode, the second pixel transistor being connected to a second gate line adjacent to the first gate line and the data line, and the second pixel electrode being connected to the second pixel transistor.

* * * * *